United States Patent [19]
Saito et al.

[11] Patent Number: 5,999,378
[45] Date of Patent: Dec. 7, 1999

[54] MAGNETORESISTANCE EFFECT HEAD HAVING A GIANT MAGNETORESISTANCE EFFECT FILM

[75] Inventors: Kazuhiro Saito, Yokohama; Hiromi Fuke, Kawasaki; Hitoshi Iwasaki, Yokosuka; Yuzo Kamiguchi; Masashi Sahashi, both of Yokohama; Hiroaki Kawashima; Taro Oike, both of Saku; Koichi Terunuma, Hoya; Haruyuki Morita, Komoro, all of Japan

[73] Assignees: Kabushiki Kaisha Toshiba; TDK Corporation, both of Japan

[21] Appl. No.: 08/980,871

[22] Filed: Dec. 1, 1997

[30] Foreign Application Priority Data

Dec. 27, 1996 [JP] Japan .................................. P8-349774

[51] Int. Cl.$^6$ ........................................................ G11B 5/39
[52] U.S. Cl. ............................................................ 360/113
[58] Field of Search ........................... 360/113; 324/252; 338/32 R; 428/212, 457, 692, 693

[56] References Cited

U.S. PATENT DOCUMENTS

| | | | |
|---|---|---|---|
| 5,549,978 | 8/1996 | Iwasaki et al. | 428/692 |
| 5,759,681 | 6/1998 | Hosoe et al. | 428/332 |
| 5,764,567 | 6/1998 | Parkin | 365/137 |
| 5,766,743 | 6/1998 | Fujikata et al. | 428/212 |
| 5,780,176 | 7/1998 | Iwasaki et al. | 428/692 |
| 5,793,279 | 8/1998 | Nepela | 338/32 R |

FOREIGN PATENT DOCUMENTS

| | | |
|---|---|---|
| 6-259731 | 9/1994 | Japan . |
| 7-57220 | 3/1995 | Japan . |

*Primary Examiner*—David D. Davis
*Attorney, Agent, or Firm*—Finnegan, Henderson, Farabow, Garrett & Dunner, L.L.P.

[57] ABSTRACT

A magnetoresistance effect head comprises a giant magnetoresistance effect film, a pair of leads to supply an electric current to the giant magnetoresistance effect head, and upper and lower magnetic shielding layers made of a crystalline soft magnetic film and disposed to hold the giant magnetoresistance effect film therebetween with a magnetic gap film intervened, wherein the surface roughness of an under layer of the giant magnetoresistance effect film is determined so that a center period L of the surface roughness satisfies L>70 nm.

7 Claims, 4 Drawing Sheets

MAGNETORESISTANCE EFFECT HEAD HAVING A GIANT MAGNETORESISTANCE EFFECT FILM

BACKGROUND OF THE INVENTION

1. Field of the Invention

The present invention relates to a shield type magnetoresistance effect head.

2. Description of the Related Art

In recent years, magnetic recording is made at a high density, and a high recording density system, e.g., an HDD having 1 Gb/inch$^2$, has become commercially practical. And a higher recording density is being demanded increasingly. As a reproducing head for such a high recording density system, attention is being given to a magnetoresistance effect head (hereinafter called "MR head") making use of a magnetoresistance effect in which an electrical resistance of a magnetic film, a magnetic multilayered film or the like is varied by an external magnetic field from the viewpoint of improvement of a reproducing sensitivity.

Figure 6:
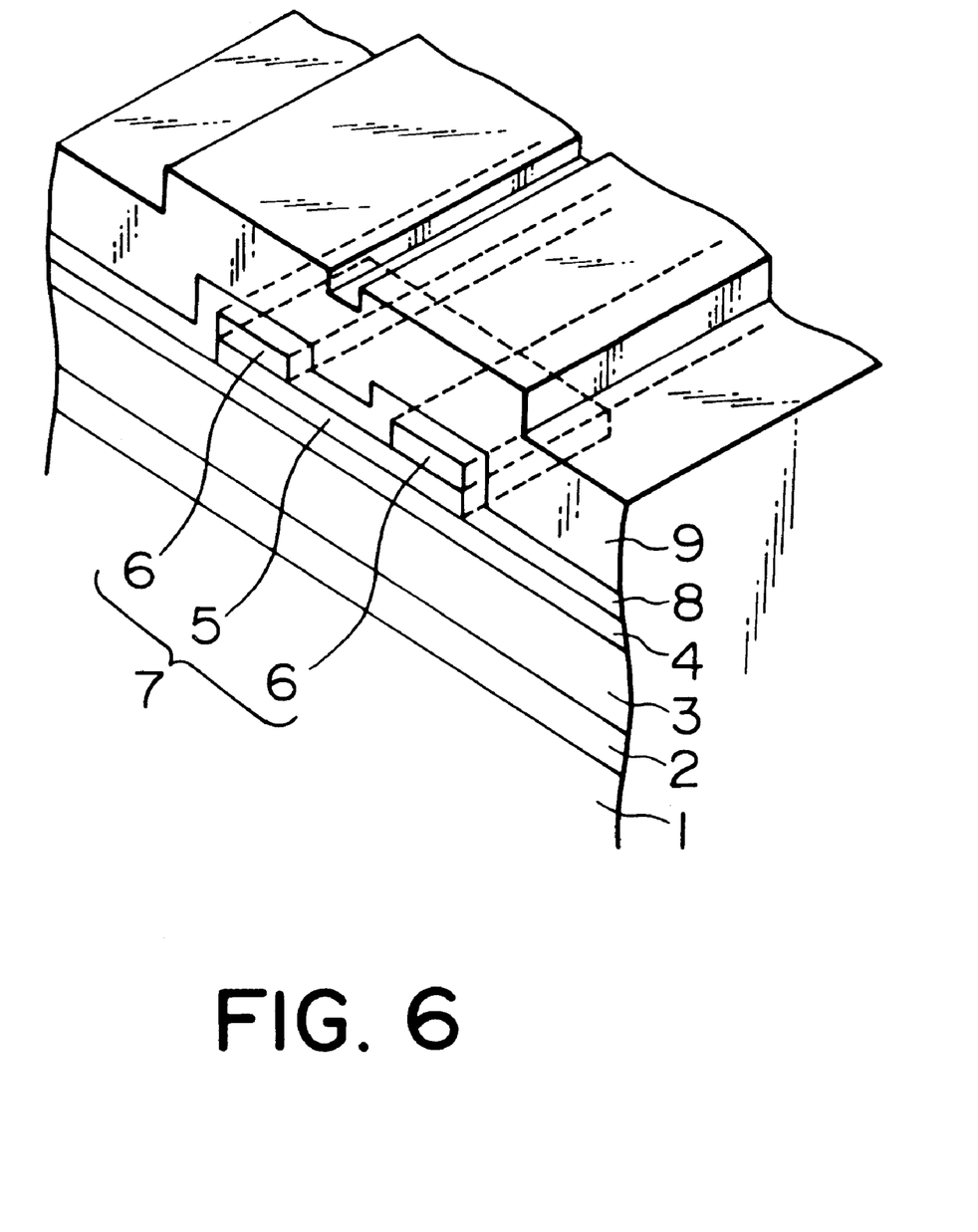
FIG. 6 is a perspective view showing the structure of a typical shield type MR head.

FIG. 6 shows the configuration of a typical shield type MR head. In the drawing, reference numeral 1 denotes a substrate made of $Al_2O_3$, TiC or the like. On the substrate 1 is formed a lower magnetic shielding layer 3 which is a crystalline soft magnetic film of sendust, permalloy or the like or an amorphous soft magnetic film of CoZrNb alloy or the like with an insulating layer 2 made of $Al_2O_3$ or the like intervened between them.

A magnetoresistance effect film (MR film) 5 is formed on the lower magnetic shielding layer 3 with an insulating film 4, which forms a lower reproducing magnetic gap, formed between them, and a pair of leads 6 are formed on both ends of the MR film 5 to form a magnetoresistance effect element (MR element) 7. On the MR element 7 is formed an upper magnetic shielding layer 9 which is made of a soft magnetic film similar to the lower magnetic shielding layer 3 with an insulating film 8, which forms an upper reproducing magnetic gap, formed between them.

To detect a signal magnetic field of such a shield type MR head, for example, a sense current is flown through the pair of leads 6, and the MR film 5 is measured for its change in electrical resistance involved with a change in average magnetization direction.

Meanwhile, the MR film is proceeding toward practical utilization provided with a giant magnetoresistance effect (hereinafter called "GMR") having a magnetoresistance change ratio (MR change ratio) of more than 3%. Especially, attention is directed to a spin-valve type GMR film which has a sandwich film with a ferromagnetic film/nonmagnetic film/ferromagnetic film structure. The spin-valve type GMR film obtains GMR by stacking one of the ferromagnetic films on an antiferromagnetic film or the like to make exchange coupling, pinning magnetization of the ferromagnetic film, and changing the magnetization direction of the other ferromagnetic film by an external magnetic field (signal magnetic field).

The GMR film described above, however, has a drawback that its properties are easily deteriorated due to the surface roughness of an under layer because the respective films have a thin thickness of about a few nm. Especially, where a crystalline soft magnetic film of sendust, permalloy or the like, which is mainly used for the existing MR head, is used as the magnetic shielding layer, there is a disadvantage that since the surface roughness is easily caused with the growth of crystal particles, the properties of the GMR film are easily deteriorated due to the surface roughness of the magnetic shielding layer.

Specifically, a so-called magnetization-free layer of the spin-valve type GMR film needs soft magnetic characteristics, but a coercive force $H_c$ of the GMR film in a direction of the axis of hard magnetization becomes high due to the surface roughness of the under layer, deteriorating the soft magnetic characteristics. The deterioration in soft magnetic characteristics of the GMR film causes Barkhausen noise.

The roughness of the under layer described above is reflected in the surface roughness of the respective component films of the GMR film and increases their roughness. Thus, magnetostatic coupling is enhanced by a shape effect of the interfacial roughness in the GMR film, and an interlayer coupling field $H_{in}$ is increased. The increase of the interlayer coupling field $H_{in}$ leads in a disadvantage that the MR head does not operate stably.

As described above, the MR film of a spin-valve type is highly expected in obtaining a high MR change ratio structurally, but where the crystalline soft magnetic film of sendust, permalloy or the like which is mainly used for the existing MR head is used as the magnetic shielding layer, it is hard to decrease the surface roughness. Consequently, there are drawbacks that the GMR film is deteriorated in view of soft magnetic characteristics, and its interlayer coupling field is increased, resulting in degrading its performance as the GMR head.

Accordingly, a GMR head having a crystalline soft magnetic film as the magnetic shielding layer is demanded that good properties can be obtained with good reproducibility by making it possible to suppress the soft magnetism of the GMR film from being deteriorated and the interlayer coupling field from being increased even when the GMR film has a large surface roughness on its under layer.

SUMMARY OF THE INVENTION

The present invention has been completed to remedy the drawbacks described above and aims to provide a magnetoresistance effect head having operation characteristics improved and the soft magnetic characteristics prevented from being deteriorated and the interlayer coupling field prevented from being increased when a crystalline soft magnetic film having a large surface roughness is used as a magnetic shielding layer.

The magnetoresistance effect head of the invention is a magnetoresistance effect head comprising a giant magnetoresistance effect film, a pair of leads to supply an electric current to the giant magnetoresistance effect head, and upper and lower magnetic shielding layers made of a crystalline soft magnetic film and disposed to hold the giant magnetoresistance effect film therebetween with a magnetic gap film intervened, wherein the surface of an under layer in contact with the giant magnetoresistance effect film has a center period L of the surface roughness satisfying L>70 nm.

A magnetic shielding layer made of the crystalline soft magnetic film is very hard to have the surface roughness made small. The surface roughness can be relieved to some extent by forming a magnetic gap film on the magnetic shielding layer, but a surface roughness of $R_{max}$>5 nm is inevitably formed on the surface of the under layer of the giant magnetoresistance effect film. Even when the under layer surface has a large $R_{max}$, the effects of respective roughness on the giant magnetoresistance effect film can be decreased by increasing the period of the surface roughness, specifically by extending the center period L of the roughness period to L>70 nm. Thus, it becomes possible to prevent the soft magnetic characteristics of the giant magnetoresistance effect film from being deteriorated and the interlayer coupling field $H_{in}$ from being increased.

Embodiments to practice the invention will be described with reference to the accompanying drawings.

Figure 1:
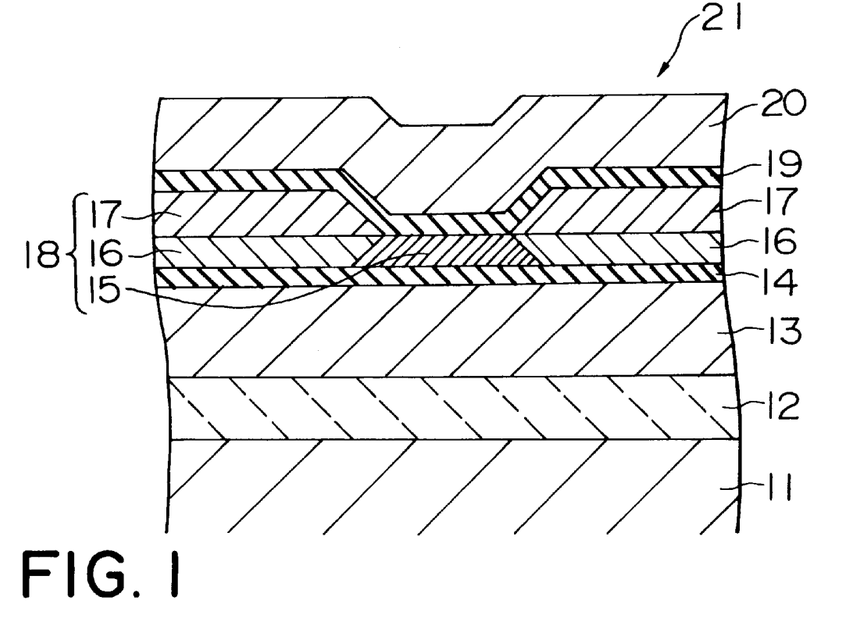
FIG. 1 is a sectional view showing the structure of a GMR head according to one embodiment of the invention.

FIG. 1 is a sectional view showing the structure of a magnetoresistance effect head (GMR head) showing an giant magnetoresistance effect according to one embodiment of the invention. In this drawing, reference numeral 11 denotes a substrate made of $Al_2O_3$. TiC or the like, and a lower magnetic shielding layer 13 made of a crystalline soft magnetic film is formed on the $Al_2O_3$. TiC substrate 11 with an insulating layer 12 made of $Al_2O_3$ or the like intervened between them. The crystalline soft magnetic film forming the lower magnetic shielding layer 13 is an Fe—Al—Si based alloy film (sendust or the like), an Fe—Ni based alloy film (permalloy or the like) or the like.

Figure 2:
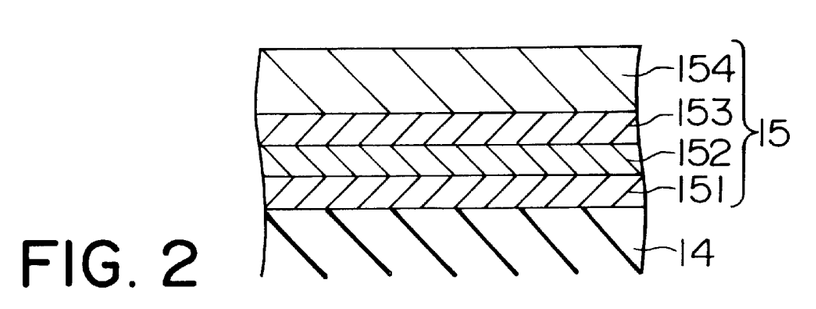
FIG. 2 is a sectional view showing a structural example of the GMR film applied to the invention.
Figure 3:
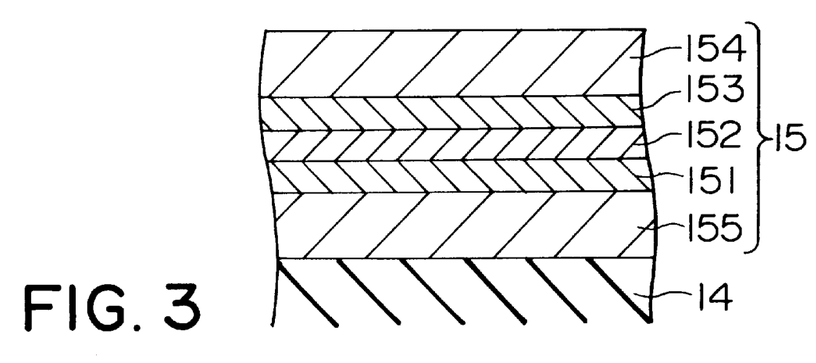
FIG. 3 is a sectional view showing another structural example of the GMR film applied to the invention.

A giant magnetoresistance effect film (GMR film) 15 having a desired shape is formed on the lower magnetic shielding layer 13 with a lower magnetic gap film 14 made of an $Al_2O_3$ film intervened between them. The GMR film 15 may be a spin-valve film which has a sandwich film formed of a ferromagnetic film, a nonmagnetic film and a ferromagnetic film with an electric resistance variable corresponding to an angle of magnetization between these ferromagnetic films, or an artificial lattice film which has a multilayered film formed by alternately stacking ferromagnetic and nonmagnetic films and exhibits GMR. And the spin-valve films configured as shown in FIG. 2 and FIG. 3 are preferably used in particular. The spin-valve film will be described in detail afterward.

In the GMR head in this embodiment, the surface of the lower magnetic gap film 14 forms the under layer of the GMR film 15, and the center period L of the surface roughness period of this under layer is determined to be L>70 nm. Thus, even when the surface roughness $R_{max}$ of the under layer of the GMR film 15 is more than 5 nm, by extending the period of the surface roughness, specifically by making the center period L larger than 70 nm, an adverse effect of the surface roughness on the GMR film 15 can be reduced. In other words, since the effects of individual roughness on the GMR film 15 can be reduced by extending the period of the surface roughness of the under layer, it is possible to prevent the soft magnetic characteristic of the GMR film 15 from being deteriorated and the interlayer coupling field from being increased.

As described above, the adverse effects on the GMR film 15 can be reduced by controlling the center period L of the surface roughness period of the under layer to more than 70 nm. But, if the surface roughness $R_{max}$ is excessively large, the adverse effects on the GMR film 15 cannot be prevented even if the roughness period is extended. Therefore, the surface roughness $R_{max}$ is preferably determined to 50 nm or below.

The surface roughness $R_{max}$ according to the present invention is determined by measuring a surface roughness of the under layer (the surface of the lower magnetic gap film 14 in this embodiment) in a predetermined area through the Atomic Force Microscope (AFM), the Transmission Electron Microscope (TEM), the high resolution Scanning Electron Microscope (high resolution SEM) or the like and determining from the measured range by an ordinary method.

The center period L was determined by the following method. Utilizing the diagram showing the profile of surface roughness of the under layer in the predetermined area obtained by the Atomic Force Microscope and the like, roughness periods L' corresponding to a distance between adjacent roughness peaks were measured. A frequency analysis was then carried out with respect to the roughness periods L'. A distribution curve is drawn up as shown in, for example, FIG. 4 from the frequency (roughness period L') and a spectrum density indicating an existence probability with respect to the frequency. And, the frequency where the spectrum density becomes maximum, namely the roughness period L', is determined as the center period L of the invention.

The surface roughness ($R_{max}$) of the under layer of the GMR film 15 and its period (center period L) are basically formed on the basis of the surface roughness of the lower magnetic shielding layer 13 made of a crystalline soft magnetic film.

By forming the lower magnetic gap film 14 on the lower magnetic shielding film 13, the surface roughness may be relieved to some extent. But, roughness is basically caused on the surface of the lower magnetic gap film 14, namely the surface of the under layer of the GMR film 15, by reflecting the surface roughness of the lower magnetic shielding layer 13.

Figure 5A:
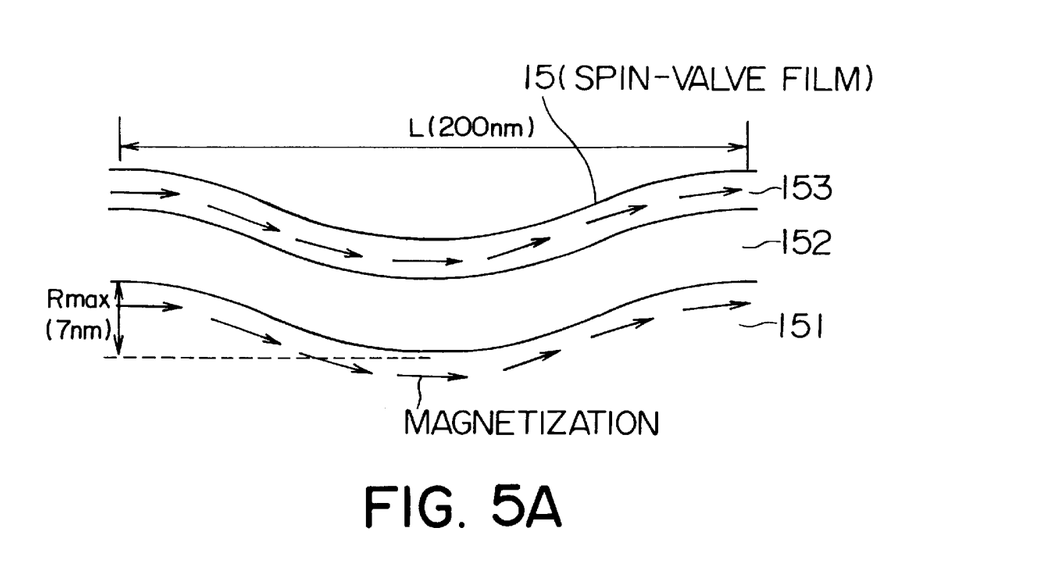

FIG. 5A is a conceptual diagram showing the surface roughness of the spin-valve film formed on the under layer having the surface roughness ($R_{max}$: 7 nm) and its period (center period L: 200 nm) and the state of magnetization in the respective magnetic layers according to the invention.

Figure 5B:
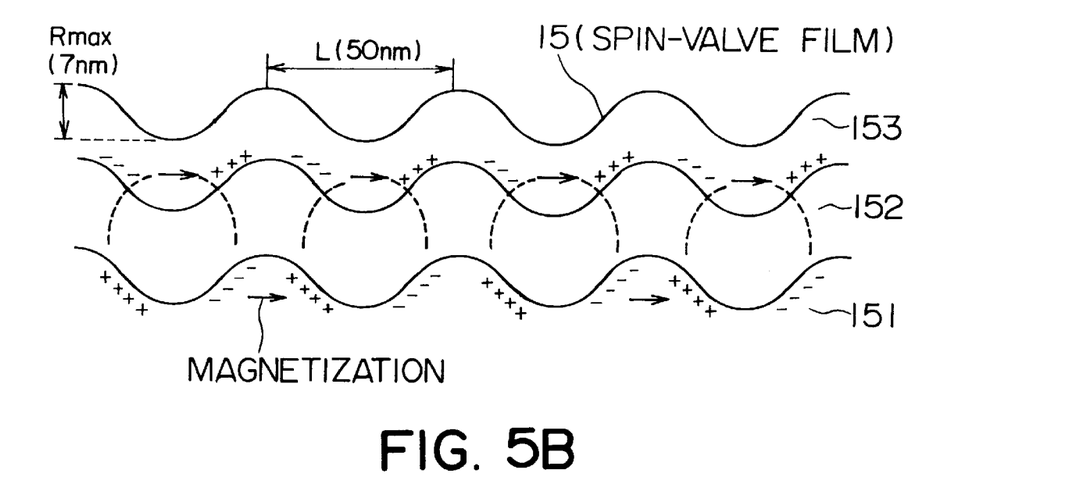

Meanwhile, FIG. 5B is a conceptual diagram showing the surface roughness of the spin-valve film formed on the under layer having the same surface roughness ($R_{max}$: 7 nm) but its period (center period L) of 50 nm which exceeds the specified range of the present invention and the state of magnetization in the respective magnetic layers.

In other words, in the case that the surface roughness period of the under layer is short, as shown in FIG. 5B, the magnetization in the ferromagnetic layers 151, 153 can not follow in the undulation of surface roughness. Thus, magnetic poles generate on the surface of the ferromagnetic layers, thereby the magnetic coupling between the upper ferromagnetic layer 151 and the under ferromagnetic layer 153 being produced.

On the other hand, in the case that the surface roughness period is long, as shown in FIG. 5A, the magnetization of the ferromagnetic layers 151, 153 arrange along the surface thereof. Thus, magnetic poles do not generate.

Based on the above view, it is seen that the invention determines the period of the surface roughness to exceed 70 nm, so that the soft magnetic characteristic of the GMR film 15 can be prevented from being deteriorated and the interlayer coupling field can be prevented from being increased.

The period of the surface roughness of the lower magnetic shielding layer 13 is basically determined by controlling the conditions for forming the lower magnetic shielding layer 13. By determining the surface roughness ($R_{max}$) and its period (center period L) of the lower magnetic shielding layer 13 to an appropriate range, the center period L of the roughness period of the surface of the under layer of the GMR film 15 can be made larger than 70 nm.

Where an additional layer is intervened between the lower magnetic gap film 14 and the GMR film 15, the same effect can be obtained by determining the center period L of the surface roughness of the layer as the direct lower layer of the MGR film 15 to have the same range as described above.

A hard magnetic film 16 made of a CoPt alloy or the like to give a bias magnetic field to the GMR film 15 is formed on both ends of the GMR film 15 in its breadth direction. And a pair of leads 17 made of Cu or the like, which is electrically connected to both ends of the GMR film 15 through the hard magnetic film 16, is formed as an electrode on the formed hard magnetic films 16. A sense current is supplied to the GMR film 15 through the pair of leads 17.

Thus, the GMR film 15, the hard magnetic film 16 and the pair of leads 17 constitute a GMR element 18.

And, the hard magnetic film 16 which gives a bias magnetic field to the GMR film 15 may be formed in advance into a desired shape, namely a shape corresponding to a magnetic field response portion, on the lower reproducing magnetic gap film 14. To do so, the GMR film 15 is formed on the lower reproducing magnetic gap film 14 and the pair of hard magnetic films 16 as well, and the pair of leads 17 is formed thereon.

On the GMR element 18 is formed an upper reproducing magnetic gap film 19 which is made of a nonmagnetic material such as $Al_2O_3$. And, an upper magnetic shielding layer 20 which is made of the same crystalline soft magnetic film as the lower magnetic shielding layer 13 is further formed thereon. Thus, a shield type GMR head 21 which serves as, for example, a reproducing head, is configured.

The magnetic shielding layers 13, 20 made of the crystalline soft magnetic material have preferably a thickness of the order of 1 to 4 $\mu$m. If the magnetic shielding layers 13, 20 have a thickness of less than 1 $\mu$m, a magnetic shielding effect might not be obtained satisfactorily. And if it exceeds 4 $\mu$m, the manufacturing process becomes difficult.

A GMR film (spin-valve GMR film) 15 made of a spin-valve film shown in FIG. 2 will be described in detail. A sandwich film formed of a ferromagnetic film 151, a nonmagnetic film 152 and a ferromagnetic film 153 is formed on a lower reproducing magnetic gap film 14. And an antiferromagnetic film 154 is stacked on the upper ferromagnetic film 153. Thus, an exchange coupling film is constituted.

The upper ferromagnetic film 153 is a so-called pinned layer whose magnetization is fixed by the exchange coupling described above. Meanwhile, the lower ferromagnetic film 151 is a so-called free layer which has the direction of magnetization varied by a signal magnetic field (external magnetic field). The pinned layer and the free layer may be positioned conversely.

The ferromagnetic films 151, 153 may be made of Fe, Co, Ni or an alloy thereof. Especially, an Fe—Ni based alloy such as permalloy, and a Co based magnetic alloy having Co added with Fe, Ni and other elements are preferably used.

In addition to the elements Fe and Ni to be added to the Co based magnetic alloy, one or two or more elements such as Pd, Au, Ag, Cu, Pt, Ir, Rh, Ru, Os and Hf can be used. They are preferably added in an amount ranging from 5 to 50 at %. The ferromagnetic films 151, 153 may be a laminated film formed by stacking at least two types of ferromagnetic films.

The nonmagnetic film 152 intervened between the ferromagnetic films 151, 153 may be various types of conductive nonmagnetic materials but preferably Cu with high spin-dependent scattering. The anti-ferromagnetic film 154 which is used in combination with the upper ferromagnetic film 153 to form an exchange coupling film is, for example, an FeMn based alloy, an IrMn based alloy or the like.

As shown in FIG. 3, a magnetic or nonmagnetic under layer 155 may be formed just under the ferromagnetic film 151. The under layer 155 may be formed as a part of the spin-valve GMR film 15. The under layer 155 may be made of one kind of magnetic film or nonmagnetic film, or a laminated film of a magnetic film and a nonmagnetic film, or a laminated film of different kinds of magnetic films.

The magnetic under layer is an amorphous soft magnetic material or a soft magnetic material having an fcc crystal structure, e.g., an NiFe alloy, an NiFeCo alloy, or a magnetic alloy having various types of additive elements added thereto. And, the nonmagnetic under layer is a nonmagnetic metal film of Ta, Zr or the like to improve an orientation.

The GMR head 21 of the embodiment described above has the crystalline soft magnetic film for the magnetic shielding layers 13, 20. Therefore, the surface roughness of the under layer (the surface of the lower magnetic gap film 14) of the GMR film 15 becomes $R_{max}$>5 nm inevitably. But, by extending the period of the surface roughness, namely making the center period L larger than 70 nm, an adverse effect of the surface roughness on the GMR film 15 can be reduced.

Accordingly, the soft magnetic characteristic of the GMR film 15 can be prevented from being deteriorated, and the interlayer coupling field $H_{in}$ between the pinned layer and the free layer of the GMR film 15 can be prevented from being increased due to the surface roughness of the lower magnetic shielding layer 13.

Since the GMR film 15 has a good soft magnetic characteristic and an appropriate interlayer coupling field, the GMR head 12 of this embodiment can have a stable operation characteristic, and Barkhausen noise can be suppressed. Thus, the operation characteristics can be improved.

In addition, the MR change ratio can also be improved by extending the period of the surface roughness. In other words, the sensitivity of the GMR head 21 can be improved. As will be apparent from the embodiments to be described afterward, the effects of improving the sensitivity can be obtained more satisfactorily by determining the center period L of the surface roughness to 150 nm<L<300 nm.

BRIEF DESCRIPTION OF THE DRAWINGS

FIG. 5A and FIG. 5B are conceptual diagrams showing the surface roughness of the GMR film formed on an under layer; FIG. 5A showing one according to the present invention, while FIG. 5B showing one not in the scope of the invention.

DESCRIPTION OF THE PREFERRED EMBODIMENTS

Specific examples of the invention will be described with reference to the accompanying drawings.

EXAMPLE 1

Comparative Example 1

As shown in FIG. 1, an $Fe_{84.1}Al_{6.2}Si_{9.7}$ crystalline soft magnetic film having a thickness of 2.0 $\mu$m was formed as a lower magnetic shielding layer 13 on an $Al_2O_3$· TiC substrate 11 with an $Al_2O_3$ insulating layer 12 intervened between them. A spin-valve GMR film 15 was formed on the lower magnetic shielding layer 13 with a lower magnetic gap film 14 made of an $Al_2O_3$ film having a thickness of 100 nm intervened between them. The spin-valve GMR film 15 comprises Ta(5 nm)/$Ni_{80}Fe_{20}$(7 nm)/Cu(3 nm)/$Ni_{80}Fe_{20}$(7 nm)/$Fe_{50}Mn_{50}$(10 nm). The spin-valve GMR film 15 was heat-treated appropriately.

The $Fe_{84.1}Al_{6.2}Si_{9.7}$ film was formed by a magnetron sputtering process. RF sputtering was employed here but DC sputtering can also be used. And, a power density was fixed to 9.3 W/cm² to form the film. A period can be increased even when the power density is decreased. Ar gas pressure was determined to 0.93 Pa.

In Comparative Example 1 for comparison with the present invention, the films up to the spin-valve GMR film 15 were formed in the same manner excepting that the Ar gas pressure was changed to 1.33 Pa to form the $Fe_{84.1}Al_{6.2}Si_{9.7}$ film by the RF magnetron sputtering process.

Accordingly, the period of surface roughness of the under layer of the spin-valve GMR film 15 was controlled by controlling the film forming conditions such as the Ar gas pressure (see Table 1), heating of the substrate, impurity ($O_2$) concentration in the gas for forming the $Fe_{84.1}Al_{6.2}Si_{9.7}$ film.

In Example 1 and Comparative Example 1, the $Fe_{84.1}Al_{6.2}Si_{9.7}$ film was examined by X-ray diffraction method. As a result, a strong diffraction peak based on a (110) plane was found, thereby the formation of a crystalline substance being confirmed.

A hard magnetic film 16 made of a CoPt alloy was formed on both sides of the spin-valve GMR film 15 in its breadth direction, and a pair of leads 17 made of Cu was further formed thereon. An upper magnetic gap film 19 made of an $Al_2O_3$ film was formed to cover the pair of leads and the spin valve GMR film 15, and an upper magnetic shielding layer 20 made of an $Fe_{84.1}Al_{6.2}Si_{9.7}$ film having a thickness of 3.0 μm was formed on the upper magnetic gap film 19 to produce a shield type GMR head 21. The same steps were performed in Comparative Example 1.

In the steps for producing the shield type GMR head 21 in Example 1 and Comparative Example 1, the surface roughness was measured by AFM when the lower magnetic gap film 14 was formed. A single sweeping covers to measure a range of 1 μm. Every sweeping covered a new range, and the average value of all sweepings was determined as the measured result. The measured results were analyzed for frequencies, and the distribution curves were drawn up in view of a spectrum density indicating an existence probability with respect to the frequency (period L' of surface roughness).

Figure 4:
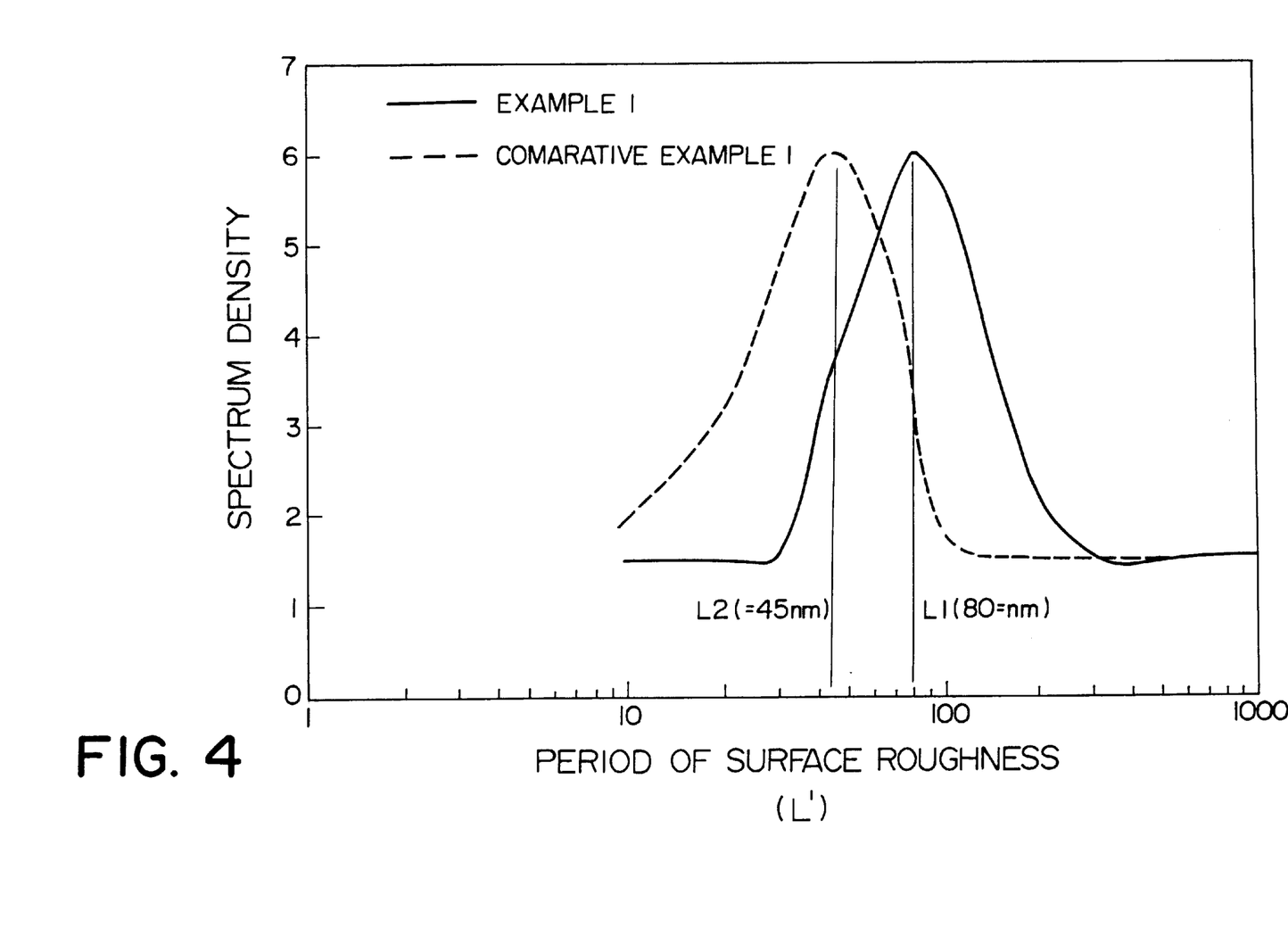
FIG. 4 is a graph showing the results of analyzing a frequency of the surface roughness of an under layer in Example 1 of the invention.

The obtained results are shown in FIG. 4. It is seen that Example 1 and Comparative Example 1 have a normal distribution curve. The center period L of the surface roughness was determined from FIG. 4 as a frequency at which the spectrum density becomes maximum, namely a period L' of surface roughness. The center period L of the surface roughness was 80 nm in Example 1 and 45 nm in Comparative Example 1. And, the surface roughness $R_{max}$ was 6.0 nm when determined from the same measured range. By varying the conditions for forming the $Fe_{84.1}Al_{6.2}Si_{9.7}$ film, the period of the surface roughness (center period L) can be controlled even when the surface roughness $R_{max}$ is the same.

As to the shield type GMR head 21 in Example 1 and Comparative Example 1 described above, an interlayer coupling field $H_{in}$ of the spin-valve GMR film 15, a coercive force $H_{ch}$ of the axis of hard magnetization of a free layer, and an MR change ratio were determined by measuring an R-H curve by a four-terminal method.

As a result, the interlayer coupling field $H_{in}$ was 20 Oe in Comparative Example 1, while it was improved to 11.5 Oe in Example 1. And, the coercive force $H_{ch}$ of the axis of hard magnetization of the free layer was improved from 2 Oe to 0.3 Oe. And the MR change ratio was improved from 3.0% to 3.5%.

EXAMPLES 2 AND 3

GMR heads were produced in the same way as in Example 1 excepting that the conditions for forming the $Fe_{84.1}Al_{6.2}Si_{9.7}$ film in Example 1 were varied so that the surface roughness $R_{max}$ of the lower magnetic gap film 14 was 10.0 nm and the center period L of the roughness period was 180 nm (Example 2), and $R_{max}$ was 8.0 nm and L was 450 nm (Example 3). The surface roughness $R_{max}$ and the center period L were determined in the same way as in Example 1.

The interlayer coupling field $H_{in}$, the coercive force $H_{ch}$ of the axis of hard magnetization of the free layer and the MR change ratio of the GMR heads were determined in the same way as in Example 1. In Example 2, $H_{in}$ was 10.0 Oe and $H_{ch}$ was 0.2 Oe, and in Example 3, $H_{in}$ was 9.0 Oe and $H_{ch}$ was 0.2 Oe. And, the MR change ratio in Example 2 was 4.0% which was larger than in Example 1.

Thus, sensitivity of the GMR head can be improved by appropriately selecting the period of the surface roughness (center period L) of the under layer of the spin-valve GMR film.

EXAMPLES 4 THROUGH 18

Comparative Examples 2 through 6

GMR heads were produced in the same way as in Examples 1 through 3 and Comparative Example 1 excepting that the GMR films have the structures as shown in Table 1. The surface roughness $R_{max}$ and the center period L were determined in the same way as in Example 1, and the interlayer coupling field $H_{in}$ between a free layer and a pinned layer of the GMR head, the coercive force $H_{ch}$ of the axis of hard magnetization of the free layer, and the MR change ratio were determined in the same way as in Example 1. The obtained results are shown in Table 1.

It was found that an Fe—Al—Si based alloy film is effective as the magnetic shielding layer even if its components vary to some extent, and the same effects can be obtained even when Cr or the like is added to improve a corrosion resistance.

TABLE 1

| | Fe—Al—Si film forming condition Ar Pressure (Pa) | Giant magnetoresistance effect film | Center period L (nm) | Rmax (nm) | Hin (Oe) | Hch of free layer (Oe) | MR change ratio (%) |
|---|---|---|---|---|---|---|---|
| Example 1 | 0.93 | Ta(5 nm)/Ni80Fe20(7 nm)/ Cu(3 nm) /Ni80Fe20(7 nm)/ Fe50Mn50(10 nm) | 80 | 6.0 | 11.5 | 0.3 | 3.5 |
| Example 2 | 0.67 | | 180 | 10.0 | 10.0 | 0.2 | 4.0 |
| Example 3 | 0.27 | | 450 | 8.0 | 9.0 | 0.2 | 3.2 |
| Comparative Example 1 | 1.33 | | 45 | 6.0 | 20.0 | 2.0 | 3.0 |
| Example 4 | 0.93 | Ta(5 nm)/Ni80Fe20(7 nm)/ Co(1 nm)/Cu(3 nm)/Co(3 nm)/ Fe50Mn50(10 nm) | 90 | 7.0 | 8.0 | 0.5 | 5.7 |
| Example 5 | 0.67 | | 200 | 10.7 | 11.0 | 0.7 | 6.3 |
| Example 6 | 0.27 | | 370 | 8.3 | 8.0 | 0.4 | 5.5 |
| Comparative Example 2 | 1.33 | | 50 | 7.0 | 24.0 | 2.5 | 5.4 |
| Example 7 | 0.93 | Ta(5 nm)/Ni80Fe20(6 nm)/ Co90Fe10(3 nm)/Cu(3 nm)/ Co90Fe10(2 nm)/ Fe50Mn50(15 nm) | 75 | 7.9 | 7.0 | 0.7 | 6.2 |
| Example 8 | 0.67 | | 250 | 10.0 | 6.0 | 0.5 | 7.2 |
| Example 9 | 0.27 | | 390 | 7.0 | 10.0 | 0.9 | 6.3 |
| Comparative Example 3 | 1.33 | | 55 | 7.9 | 18.0 | 3.0 | 6.0 |
| Example 10 | 0.93 | Ta(5 nm)/Ni80Fe20(6 nm)/ Co90Fe10(3 nm)/Cu(3 nm)/ Co(2 nm)/Ir25Mn75(6 nm) | 100 | 6.5 | 9.0 | 0.6 | 6.4 |
| Example 11 | 0.67 | | 220 | 11.0 | 10.0 | 0.6 | 7.0 |
| Example 12 | 0.27 | | 410 | 7.0 | 6.0 | 0.4 | 6.6 |
| Comparative Example 4 | 1.33 | | 53 | 6.5 | 18.0 | 2.7 | 6.2 |
| Example 13 | 0.93 | Co87Zr5.5Nb7.5(10 nm)/ Ni80Fe20(2 nm)/ Co90Fe10(3 nm)/Cu(3 nm)/ Co90Fe10(2 nm)/ Ir25Mn75(6 nm) | 80 | 8.0 | 15.0 | 0.2 | 7.2 |
| Example 14 | 0.67 | | 190 | 11.4 | 2.4 | 0.3 | 8.1 |
| Example 15 | 0.27 | | 420 | 7.3 | 1.5 | 0.2 | 7.4 |
| Comparative Example 5 | 1.33 | | 35 | 8.0 | 3.5 | 3.2 | 7.0 |
| Example 16 | 0.93 | Co87Zr5.5Nb7.5(10 nm)/ Ni80Fe20(2 nm)/ Co90Fe10(3 nm)/Cu(3 nm)/ Co90Fe10(2 nm)/ Fe50Mn50(15 nm) | 80 | 6.0 | 1.9 | 0.2 | 6.8 |
| Example 17 | 0.67 | | 210 | 12.0 | 3.6 | 0.2 | 7.6 |
| Example 18 | 0.27 | | 390 | 7.5 | 3.3 | 0.1 | 7.0 |
| Comparative Example 6 | 1.33 | | 40 | 6.0 | 19.0 | 2.3 | 6.5 |

EXAMPLE 19

Comparative Example 7

As shown in FIG. 1 $Ni_{80}Fe_{20}$ crystalline soft magnetic film having thickness of 2.0 μm was formed as a lower magnetic shielding layer 13 on an $Al_2O_3$. TiC substrate 11 with an $Al_2O_3$ insulating layer 12 intervened between them. A spin-valve GMR film 15 was formed on the lower magnetic shielding layer 13 with a lower magnetic gap film 14 made of an $Al_2O_3$ film having a thickness of 100 nm intervened between them. The spin-valve GMR film 15 was constituted in the same way as in Example 1.

In Example 19, the $Ni_{80}Fe_{20}$ film was formed by a magnetron sputtering process. Although DC sputtering was employed, RF sputtering can also be used. A power density was fixed to 1.9 W/cm² to form the film. A period can be increased even when the power density is decreased. Ar gas pressure was determined to 0.80 Pa.

In Comparative Example 7 to be compared with the present invention, the films up to the spin-valve GMR film 15 were formed in the same manner excepting that the Ar gas pressure was changed to 1.33 Pa to form the $Ni_{80}Fe_{20}$ film by the RF magnetron sputtering process.

Thus, a period of surface roughness of the under layer of the spin-valve GMR film 15 was controlled by controlling the film forming conditions of the $Ni_{80}Fe_{20}$ film. In Example 19 and Comparative Example 7, the $Ni_{80}Fe_{20}$ film was examined by X-ray diffraction. A strong diffraction peak based on a (111) plane was found. Thus, the formation of a crystalline substance was confirmed.

A hard magnetic film 16 made of a CoPt alloy was formed on both sides of the spin-valve GMR film 15 in its breadth direction, and a pair of leads 17 made of Cu were further formed thereon. An upper magnetic gap film 19 made of an $Al_2O_3$ film was formed to cover the pair of leads 17 and the spin valve GMR film 15, and an upper magnetic shielding layer 20 made of an $Ni_{80}Fe_{20}$ film having a thickness of 3.0 μm was formed on the upper magnetic gap film 19 to produce a shield type GMR head 21. The same steps were performed in Comparative Example 7.

In the steps for producing the shield type GMR head 21 in Example 19 and Comparative Example 7, the surface roughness was measured by AFM when the lower magnetic gap film 14 was formed. And, the surface roughness $R_{max}$ and the center period L of the roughness period were determined in the same way as in Example 1. As a result, the center period L was 75 nm and $R_{max}$ was 5.5 nm in Example 19, and the center period L was 50 nm and $R_{max}$ was 6.5 nm in Comparative Example 7. Thus, a period (center period L) of surface roughness can be controlled by varying the conditions for forming the $Ni_{80}Fe_{20}$ film.

As to the shield type GMR head 21 in Example 19 and Comparative Example 7, the interlayer coupling field $H_{in}$ between the free layer and the pinned layer of the spin-valve GMR film 15, the coercive force $H_{ch}$ of the axis of hard magnetization of the free layer and the MR change ratio were determined in the same way as in Example 1. As a result, the interlayer coupling field $H_{in}$ was 22 Oe in Comparative Example 7, while it was improved to 11.5 Oe in Example 19. And, the coercive force $H_{ch}$ of the axis of hard magnetization of the free layer was improved from 2.5 Oe to 0.3 Oe. And the MR change ratio was improved from 2.9% to 3.3%.

EXAMPLES 20, 21

GMR heads were produced in the same way as in Example 19 excepting that the conditions for forming the $Ni_{80}Fe_{20}$ film in Example 19 were varied so that the surface roughness $R_{max}$ of the lower magnetic gap film 14 was 9.5 nm and the center period L of the roughness period was 175 nm (Example 20), and $R_{max}$ was 8.5 nm and the center period L was 480 nm (Example 21). The surface roughness $R_{max}$ and the center period L were determined in the same way as in Example 1.

The interlayer coupling field $H_{in}$ between the free layer and the pinned layer of the GMR head, the coercive force $H_{ch}$ of the axis of hard magnetization of the free layer and the MR change ratio of the GMR heads were determined in the same way as in Example 1. In Example 20, the interlayer coupling field $H_{in}$ was 9.5 Oe and the coercive force $H_{ch}$ was 0.2 Oe, and in Example 21, $H_{in}$ was 9.0 Oe and $H_{ch}$ was 0.2 Oe. And, the MR change ratio in Example 20 was 3.8% which was larger than in Example 19. Thus, sensitivity of the GMR head can be improved by appropriately selecting the period of the surface roughness (center period L) of the under layer of the spin-valve GMR film even when the $Ni_{80}Fe_{20}$ film is used as the magnetic shielding layer.

EXAMPLES 22 THROUGH 36

Comparative Examples 8 through 12

GMR heads were produced in the same way as in Examples 19 through 21 and Comparative Example 7 excepting that the GMR films were constituted as shown in Table 2. The surface roughness $R_{max}$ and the center period L were determined in the same way as in Example 1. And, the interlayer coupling field $H_{in}$ between the free layer and the pin layer of the GMR head, the coercive force $H_{ch}$ of the axis of hard magnetization of the free layer and the MR change ratio were determined in the same way as in Example 1. The results obtained are shown in Table 2.

TABLE 2

| | $Ni_{80}Fe_{20}$ film forming condition Ar Pressure (Pa) | Giant magnetoresistance effect film | Center period L (nm) | Rmax (nm) | Hin (Oe) | Hch of free layer (Oe) | MR change ratio (%) |
|---|---|---|---|---|---|---|---|
| Example 19 | 0.80 | Ta(5 nm)/Ni80Fe20(7 nm)/ Cu(3 nm)/Ni80Fe20(7 nm)/ Fe50Mn50(10 nm) | 75 | 5.5 | 11.6 | 0.3 | 3.3 |
| Example 20 | 0.40 | | 175 | 9.5 | 9.5 | 0.2 | 3.8 |
| Example 21 | 0.13 | | 480 | 8.5 | 9.0 | 0.2 | 3.4 |
| Comparative Example 7 | 1.33 | | 50 | 6.5 | 22.0 | 2.5 | 2.9 |
| Example 22 | 0.80 | Ta(5 nm)/Ni80Fe20(7 nm)/ Co(1 nm)/Cu(3 nm)/Co(3 nm)/ Fe50Mn50(10 nm) | 85 | 6.5 | 7.5 | 0.5 | 5.6 |
| Example 23 | 0.40 | | 190 | 9.0 | 10.0 | 0.5 | 6.2 |
| Example 24 | 0.13 | | 390 | 8.4 | 9.0 | 0.4 | 5.6 |
| Comparative Example 8 | 1.33 | | 55 | 7.3 | 24.0 | 2.5 | 5.6 |
| Example 25 | 0.80 | Ta(5 nm)/Ni80Fe20(6 nm)/ Co90Fe10(3 nm)/Cu(3 nm)/ Co90Fe10(2 nm)/ Fe50Mn50(15mn) | 80 | 8.0 | 7.5 | 0.7 | 6.1 |
| Example 26 | 0.40 | | 220 | 10.5 | 6.0 | 0.5 | 7.3 |
| Example 27 | 0.13 | | 410 | 7.0 | 11.0 | 0.9 | 6.3 |
| Comparative Example 9 | 1.33 | | 50 | 7.8 | 17.5 | 2.8 | 6.0 |

TABLE 2-continued

| | Ni$_{80}$Fe$_{20}$ film forming condition Ar Pressure (Pa) | Giant magnetoresistance effect film | Center period L (nm) | Rmax (nm) | Hin (Oe) | Hch of free layer (Oe) | MR change ratio (%) |
|---|---|---|---|---|---|---|---|
| Example 28 | 0.80 | Ta(5 nm)/Ni80Fe20(6 nm)/ Co90Fe10(3 nm)/Cu(3 nm)/ Co(2 nm)/Ir25Mn75(6 nm) | 90 | 6.3 | 8.5 | 0.5 | 6.4 |
| Example 29 | 0.40 | | 210 | 10.0 | 9.0 | 0.6 | 6.8 |
| Example 30 | 0.13 | | 400 | 6.8 | 5.8 | 0.4 | 6.9 |
| Comparative Example 10 | 1.33 | | 45 | 6.0 | 17.0 | 2.6 | 6.0 |
| Example 31 | 0.80 | Co87Zr5.5Nb7.5(10 nm)/ Ni80Fe20(2 nm)/ Co90Fe10(3 nm)/Cu(3 nm)/ Co90Fe10(2 nm)/ Ir25Mn75(6 nm) | 85 | 8.5 | 16.0 | 0.2 | 7.3 |
| Example 32 | 0.40 | | 205 | 12.0 | 3.0 | 0.3 | 8.0 |
| Example 33 | 0.13 | | 430 | 7.4 | 1.5 | 0.3 | 7.5 |
| Comparative Example 11 | 1.33 | | 40 | 8.2 | 4.0 | 3.5 | 7.0 |
| Example 34 | 0.80 | Co87Zr5.5Nb7.5(10 nm)/ Ni80Fe20(2 nm)/ Co90Fe10(3 nm)/Cu(3 nm)/ Co90Fe10(2 nm)/ Fe50Mn50(15 nm) | 75 | 5.7 | 1.6 | 0.2 | 6.6 |
| Example 35 | 0.40 | | 205 | 11.5 | 3.5 | 0.1 | 7.4 |
| Example 36 | 0.13 | | 380 | 7.2 | 3.0 | 0.1 | 6.8 |
| Comparative Example 12 | 1.33 | | 45 | 5.8 | 18.0 | 2.1 | 6.4 |

It is apparent from Table 1 and Table 2 that the center period L of the under layer of the spin-valve GMR film is preferably determined to be 150 nm<L<300 nm in order to improve the MR change ratio too.

As described above, the magnetoresistance effect head of the invention can improve the film characteristics such as the soft magnetic characteristics and the interlayer coupling field of a giant magnetoresistance effect film even on the magnetic shielding layer made of a crystalline soft magnetic film having a large surface roughness. And, the magnetoresistance change ratio can also be improved. Accordingly, it is possible to provide a magnetoresistance effect head excelling in operation and sensitivity characteristics.

What is claimed is:

1. A magnetoresistance effect head comprising:
   a giant magnetoresistance effect film,
   a pair of leads to supply an electric current to the giant magnetoresistance effect film, and
   upper and lower magnetic shielding layers made of a crystalline soft magnetic film and disposed to hold the giant magnetoresistance effect film therebetween with a magnetic gap film intervened, wherein
   a surface of an under layer in contact with the giant magnetoresistance effect film has a center period L of a surface roughness of more than 70 nm to not more than 480 nm, wherein the center period L is obtained by measuring roughness periods L' in a predetermined area of the under layer, and by determining a period where a spectrum density becomes maximum from the distribution curve of the roughness periods L' and the spectrum density, which shows an existence probability of frequency of the roughness periods.

2. The magnetoresistance effect head as set forth in claim 1, wherein the center period L of the surface roughness is a value satisfying 150 nm<L<300 nm.

3. The magnetoresistance effect head as set forth in claim 1, wherein the crystalline soft magnetic film is made of an Fe—Al—Si based alloy.

4. The magnetoresistance effect head as set forth in claim 1, wherein the crystalline soft magnetic film is made of an NiFe alloy.

5. The magnetoresistance effect head as set forth in claim 1, wherein the giant magnetoresistance effect film is a sandwich film formed of a ferromagnetic film, a nonmagnetic film, and a ferromagnetic film.

6. The magnetoresistance effect head as set forth in claim 1, wherein the surface of the under layer of the giant magnetoresistance effect film has a maximum height Rmax of the surface roughness of 50 nm or less wherein a single sweep range for measuring the surface roughness is about 1 μm.

7. The magnetoresistance effect head as set forth in claim 1, wherein the surface of the under layer of the giant magnetoresistance effect film has a maximum height Rmax of the surface roughness of over 5 nm, wherein a single sweep range for measuring the surface roughness is about 1 μm.

* * * * *